Figure 1:
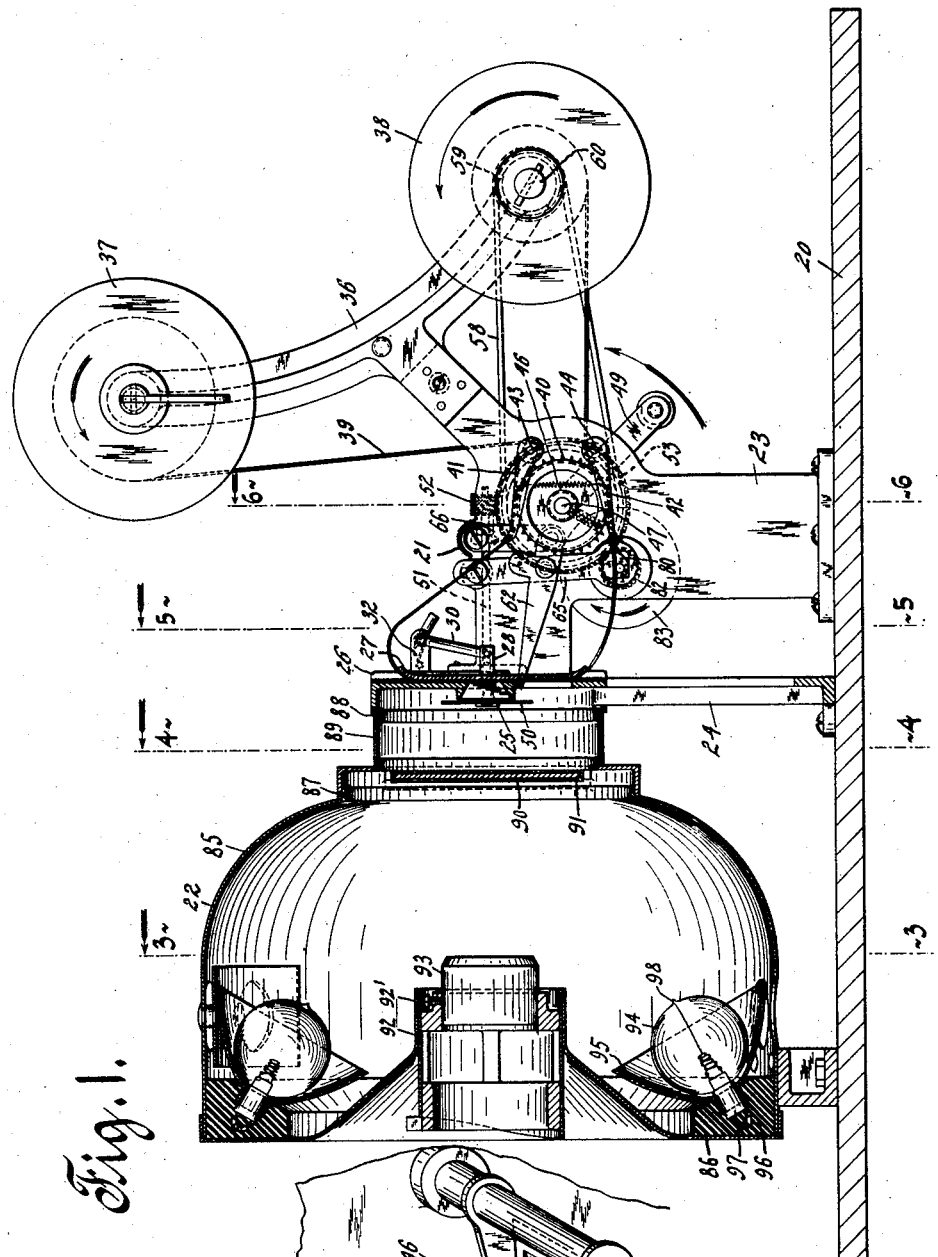

H. W. WEBB.
KINETOGRAPHIC APPARATUS.
APPLICATION FILED FEB. 16, 1916.

1,197,696.

Patented Sept. 12, 1916.
5 SHEETS—SHEET 1.

WITNESS
Ch. Kane

INVENTOR
H. W. Webb
BY
Sigmund Herzog
his ATTORNEY

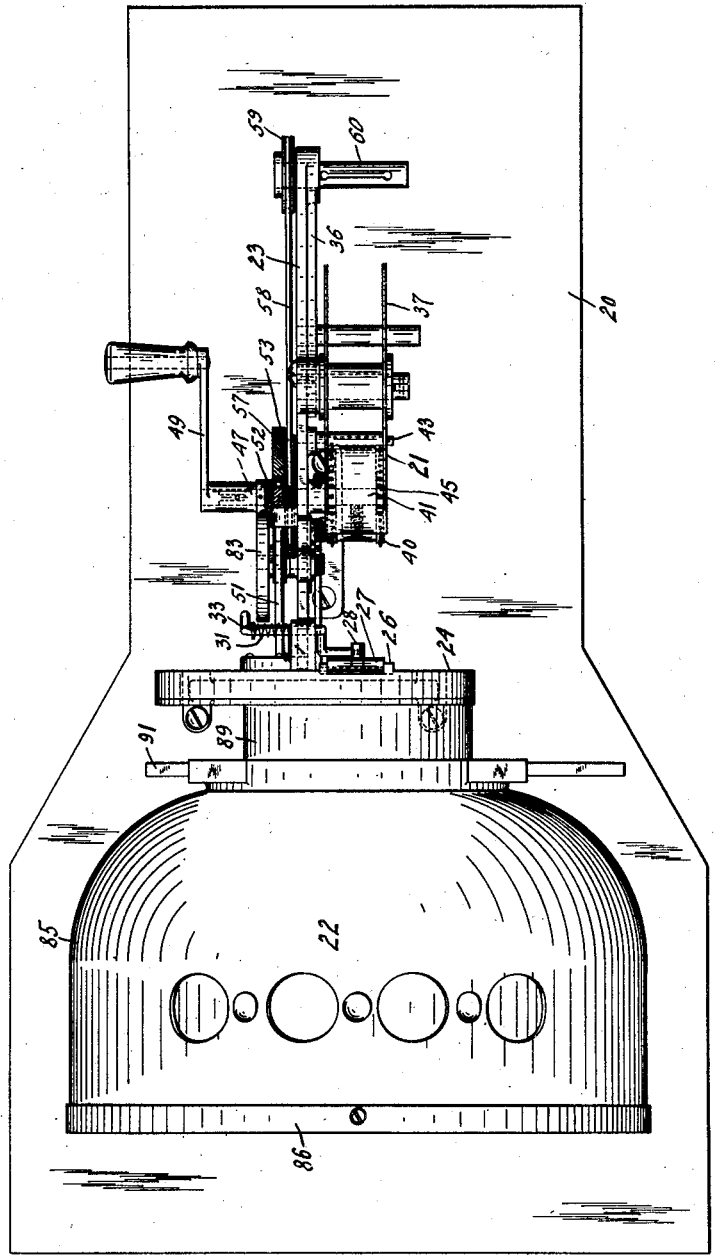

H. W. WEBB.
KINETOGRAPHIC APPARATUS.
APPLICATION FILED FEB. 16, 1916.

1,197,696.

Patented Sept. 12, 1916.
5 SHEETS—SHEET 3.

WITNESS

INVENTOR
H. W. Webb
BY
his ATTORNEY

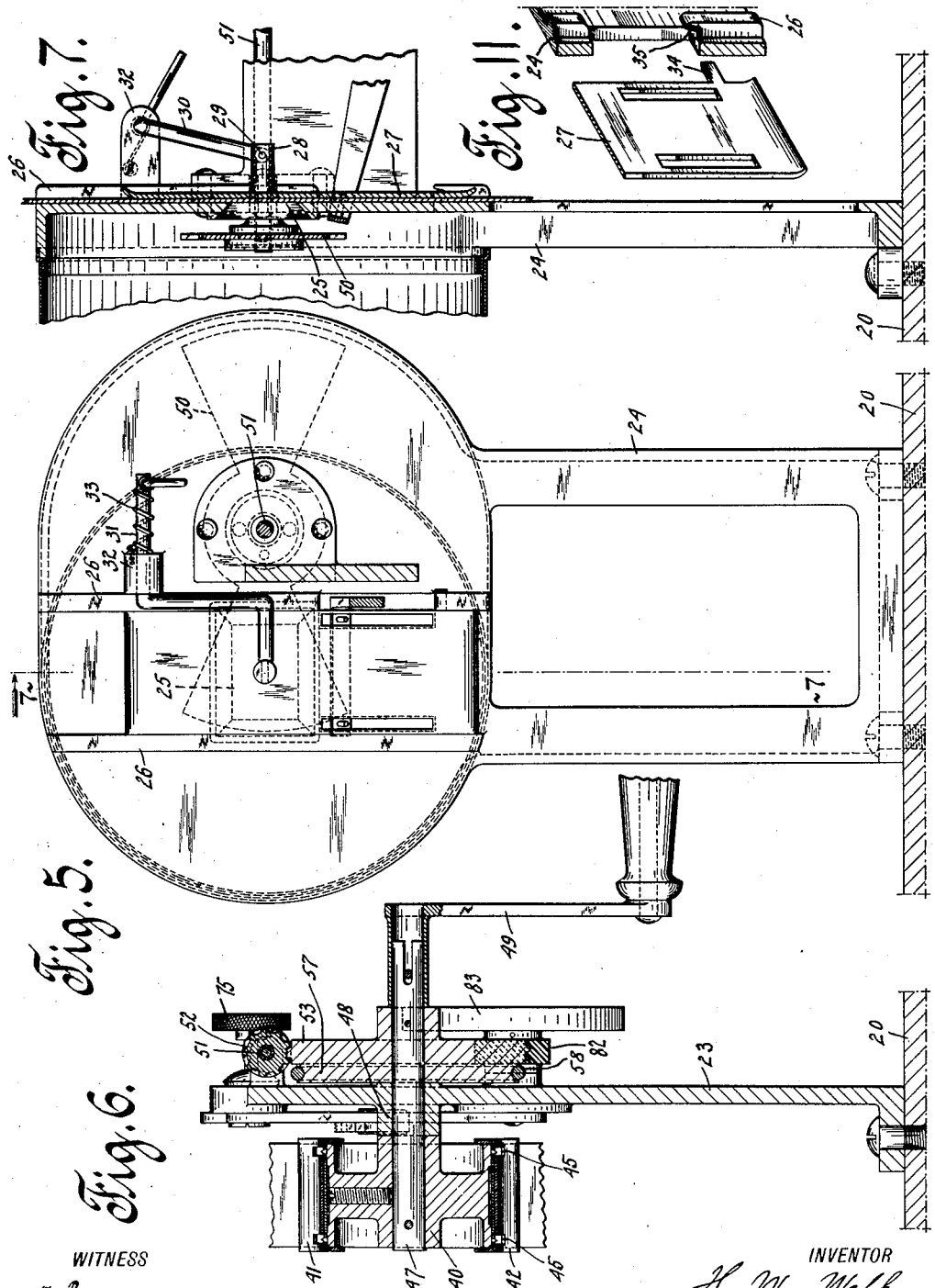

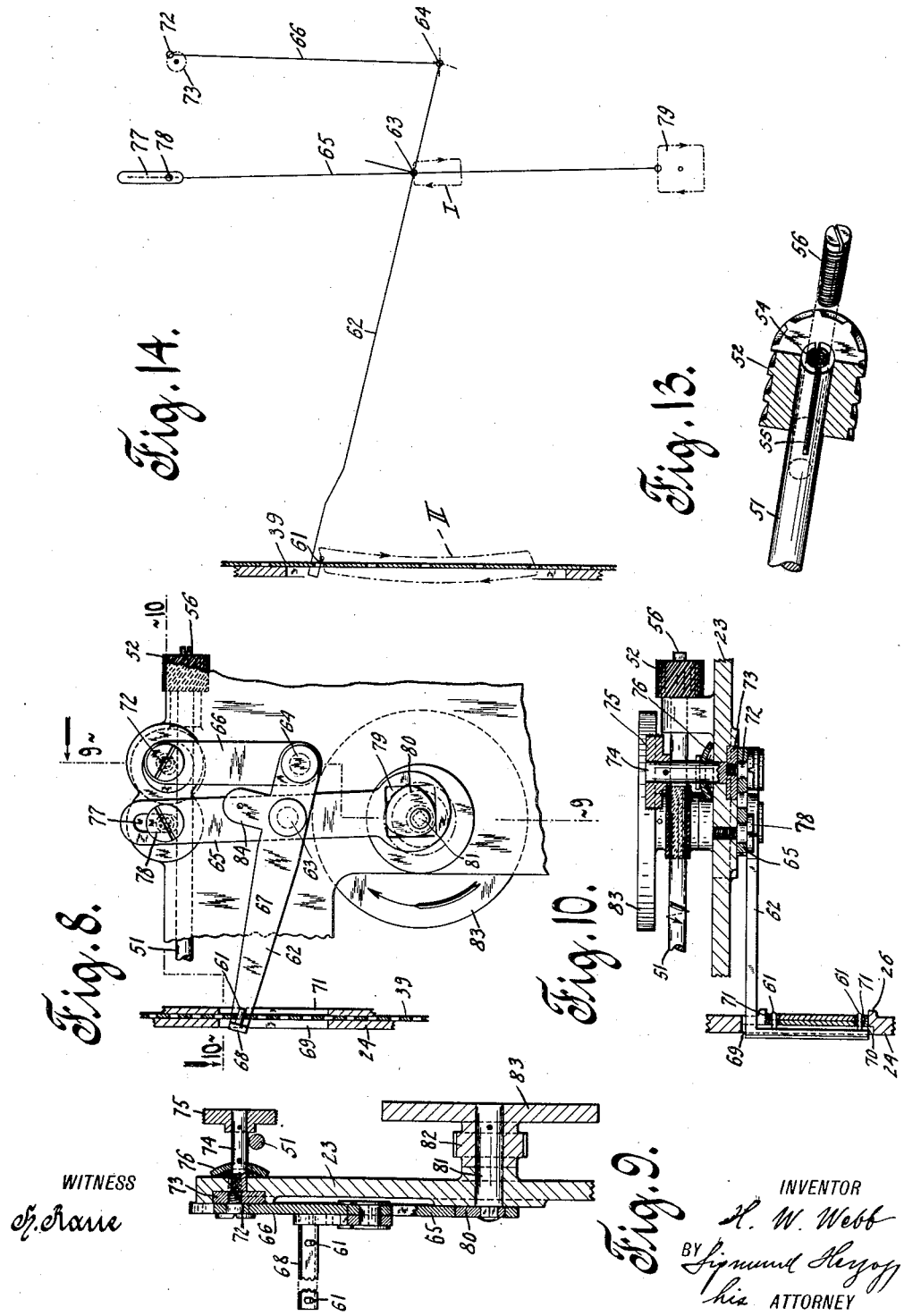

UNITED STATES PATENT OFFICE.

HARTWELL W. WEBB, OF CRESSKILL, NEW JERSEY.

KINETOGRAPHIC APPARATUS.

1,197,696. Specification of Letters Patent. Patented Sept. 12, 1916.

Application filed February 16, 1916. Serial No. 78,614.

*To all whom it may concern:*

Be it known that I, HARTWELL W. WEBB, a citizen of the United States, and a resident of Cresskill, in the county of Bergen and State of New Jersey, have invented certain new and useful Improvements in Kinetographic Apparatus, of which the following is a specification.

The present invention relates to improvements in cinematographic apparatus, and more particularly to the type which works on the reflection principle, that is to say in which the light generated by suitable illuminating means is presented directly at the exposed area of an opaque film band, the images of which are projected by means of direct reflection of rays onto a distant surface or screen. Devices of this type have been proposed heretofore, but it is to be noted that in the same the source of light was either disposed outside of the apparatus or in a lamp-house connected therewith, the beam of light passing therefrom to the exposed area of the opaque film band at an angle of about 45°, thereby resulting in a great loss of the illuminating power of said source, the maximum of which is obtained obviously when the rays of light strike the surface to be illuminated at an angle of 90° to the plane of said surface. It is to be observed that in devices of this type, owing to the inflammability of the opaque film band, light sources of limited power only can be used, so that, even if the loss of light, due to the arrangement above referred to, would not necessarily have to be taken into consideration, the power of the source could not be increased, inasmuch as in such case the film would be inflamed. Another defect of the type of the devices above mentioned and heretofore in use consists in that in connection with external source of light condensing lenses have to be used, with a result that a multi-colored light is presented to the film band, which produces on the screen a picture, the edges of which are colored, while at its central portion it is substantially white.

Owing to the fact that the rays of light are presented at the exposed area of the film band at an angle of about 45° in the devices heretofore in use, the said exposed area is unevenly illuminated, such unevenness being clearly visible as the pictures are reflected onto a distant surface or screen. In other devices of this type it has been proposed to arrange the sources of light so that the light rays strike the exposed area of the film band at substantially right angles. In these devices, however, the beam of light issuing from a light source had to be diverged so as not to ignite the film. The illuminating power of the source is thus materially decreased.

The main object of the present invention is to obviate the defects above mentioned.

Another object of the invention is to produce a cinematographic apparatus, by means of which a stationary object, such as, for instance pictures, are also adapted to be projected or reflected onto a screen.

With these and other objects in view, which will more fully appear as the nature of the invention is better understood, the same consists in the combination, arrangement and construction of parts hereinafter fully described, pointed out in the appended claims and illustrated in the accompanying drawings, it being understood that many changes may be made in the size and proportion of the several parts and details of construction within the scope of the appended claims without departing from the spirit or sacrificing any of the advantages of the invention.

One of the many possible embodiments of the invention is illustrated in the accompanying drawings, in which:—

Figure 12:
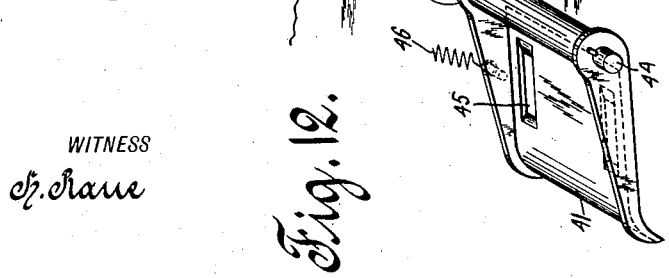
Figure 3:
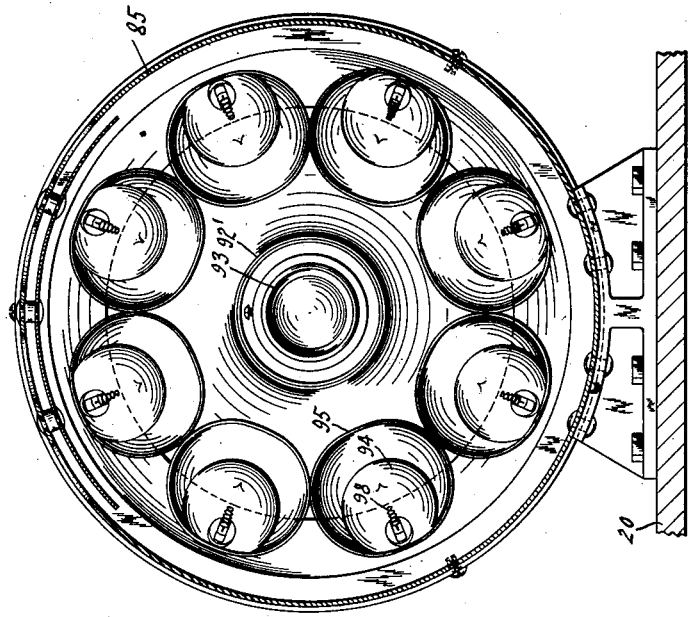
Figure 4:
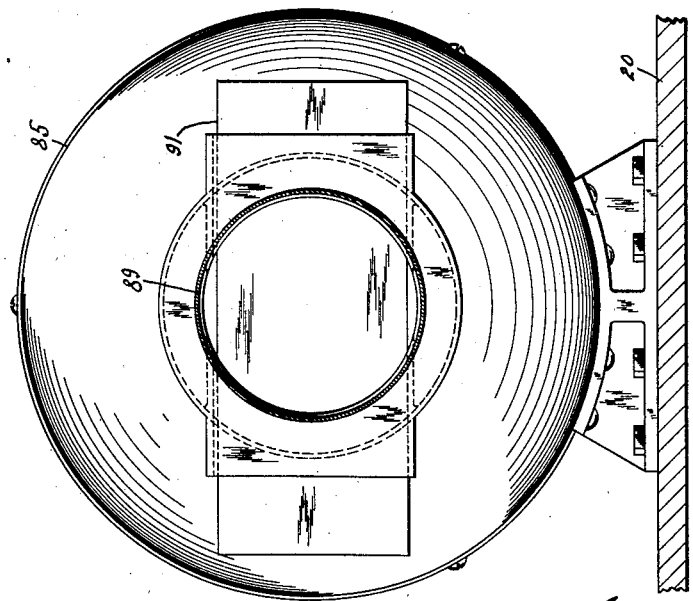

Figure 1 is a central vertical longitudinal section, partly in elevation, taken through an apparatus constructed in accordance with the present invention; Fig. 2 is a plan view thereof; Fig. 3 is a section taken on line 3—3 of Fig. 1; Fig. 4 is a section taken on line 4—4 of Fig. 1; Fig. 5 is a section taken on line 5—5 of Fig. 1, on a larger scale; Fig. 6 is a section taken on line 6—6 of Fig. 1, also on a larger scale; Fig. 7 is a section taken on line 7—7 of Fig. 5; Fig. 8 is a side elevation of a detail of the film feeding mechanism; Fig. 9 is a section taken on line 9—9 of Fig. 8; Fig. 10 is a section taken on line 10—10 of Fig. 8; Fig. 11 is a perspective view of a gate associated with the film feeding mechanism; Fig. 12 is a perspective view of a presser plate associated with the film feeding mechanism; Fig. 13 is a perspective view, partly in section, of the shutter adjusting means associated with the film feeding mechanism; and Fig. 14 is a diagram of the movement of certain elements of the film feeding mechanism.

Referring now to the drawings, the numeral 20 indicates a base plate, upon which is mounted a film feeding mechanism 21 and a light reflecting means 22. The film feeding mechanism is mounted upon a frame, comprising a longitudinally arranged section 23, and in front thereof a transversely disposed section 24, which are shown in the drawings as being bolted together, although it will be understood that they may be cast in one integral piece, if so desired. The frame is attached by screws or otherwise to the base plate. In the frame section 24 is formed an exposure opening 25, which corresponds in size to that of an individual picture on the film band. The exposure opening is disposed between two parallel vertically extending ledges 26, which are formed upon the rear face of the frame section 24, the distance between said ledges corresponding to the width of the film band, serving thus as a guide for the latter. With the exposure opening and the said ledges is associated a gate 27, that is made, preferably, of a heat conducting material, such as metal, and covers the exposure opening, for a purpose hereinafter to be described. This gate is provided with a rearwardly extending projection 28, that is pivotally engaged at 29 by a lever 30, having a horizontally extending arm 31, the latter being fulcrumed on a lug 32 upon the frame section 24. Around this arm is coiled a spring 33, one end of which is fastened to the said lug and the other end to the arm, thereby keeping the gate under tension. In order to hold the gate properly in place, it is provided with a finger 34, that is adapted to engage with a hook-shaped projection 35 upon the frame section 24.

A bracket 36 is mounted upon the frame section 23 and serves to support a supply reel 37 and a wind-up reel 38. The film, denoted in the drawings by the numeral 39, is led from the supply reel to a continuously rotating sprocket 40, thence past the exposure opening between the ledges 26 and in front of the gate 27 downward to the sprocket, and from there to the wind-up reel 38. Above and below the gate there are formed in the film band loops for the well known purpose. The film band is engaged by the sprocket 40 at substantially diametrically opposite points of the latter, and is kept continuously in engagement with said sprocket by two presser plates 41 and 42, which are oscillatably mounted upon spindles 43 and 44, respectively. One of these presser plates is disposed above and the other one below the sprocket, and each of the same is provided with slots 45 in alinement with the teeth of the said sprocket. A spring 46 engages the two presser plates and keeps the same against the film that travels between the said plates and the sprocket. The sprocket is keyed or otherwise fixedly attached to the main driving shaft 47 of the apparatus, said shaft being journaled in a bearing 48, formed upon the frame section 23, and is provided with a crank 49 for the well known purpose. With the exposure opening coöperates a shutter 50, that is disposed in front of the exposure opening and attached to a shaft 51, which is journaled in bearings upon the two frame sections, and carries upon its rear end an oblique toothed pinion 52, in mesh with an oblique toothed gear 53, that is keyed or otherwise fixedly attached to the main driving shaft. In order to permit the relative position of the shutter and exposure opening to be varied, the structure illustrated in Fig. 13 of the drawings may be made use of. In this construction the end of the shaft 51, over which the pinion 52 is drawn, is provided with a screw threaded tapered bore 54 and with longitudinal slots 55. With the threads of the bore meshes a tapered screw bolt 56. If it is intended to vary the relation between the shutter and exposure opening, the screw bolt 56 is unscrewed from the bore 54, and the shaft 51 given a partial turn according to the distance to which the shutter is to be shifted in relation to the exposure opening, after which the bolt 56 is again screwed up, thereby distending the bored end of the shaft and fixedly attaching the same to the pinion 52. With the gear 53 is made, for instance, integral a pulley 57, over which runs a belt 58, that runs also over a pulley 59, which is attached to the spindle 60 of the wind-up reel.

The means for intermittently feeding the film past the exposure opening comprises two feeding fingers 61, which are carried by an arm 62, that is fulcrumed at 63 and 64 to a lever 65 and a link 66, respectively. This arm comprises two sections, denoted by the numerals 67 and 68, the section 67 being disposed parallel to the frame section 23, and the section 68 being bent at right angles to the section 67. The section 67 of the arm extends through an aperture 69 in the frame section 24, the fingers 61 upon the section 68 projecting rearward through the aperture 69 and a slot 70 in the said frame section, and also through slots 71 in the gate, the aperture 69 and the slot 70 being in alinement with the slots 71. The link 66 is eccentrically pivoted at 72 to a disk 73, that is rotatably mounted in the frame section 23, its spindle 74 being provided with a milled knob 75 to facilitate the handling thereof. A spring 76 serves to keep the disk fixed in position. The lever 65 extends substantially vertically and is provided at its upper end with a slot 77, in which is seated a pin in the form of a screw 78, about which the said lever is adapted to oscillate and to move substantially in the direction of its longitudinal axis. In the lower end of the lever is formed a substantially square opening 79, in which is seated a cam 80, said cam being mounted upon a spindle 81, which is journaled in the frame section 23, and has fixedly attached thereto an oblique toothed pinion 82, in mesh with the oblique toothed gear 53. Upon this spindle is also mounted a fly-wheel 83, for the well known purpose. The section 67 of the arm 62 is provided with an upwardly projecting extension 84, that bears against the lever 65 and serves to take up the thrust upon the feeding fingers.

The operation of the device described is as follows: The sprocket 40 is continuously rotated with a result that the film band is unwound from the supply reel and rewound upon the wind-up reel. The cam 80 rotates also continuously, actuating, however, the feeding fingers in such a manner that an intermittent movement of the film is obtained past the exposure opening. The cam 80, in coöperation with the horizontal working faces of the opening 79, causes the lever 65 to move up and down in the direction of its longitudinal axis, and in coöperation with the vertical working faces of the opening 79 to swing toward and away from the frame section 24 about the pivot 78. The fulcrum 63 of the arm 62 describes therefore an oblong figure, denoted by the numeral 1, as shown in Fig. 14 of the drawings, and, inasmuch as this arm is fulcrumed at 64 to the link 66, the fingers 61 describe each an oblong figure, denoted by the numeral 11 in Fig. 14. The fingers are thus caused to engage the perforations in the film when they arrive at their uppermost positions and move somewhat rearward. At the end of their rearward movement, the lever 65 is caused to swing downward, whereby the film band is advanced. When the fingers arrive at or near their lowermost positions, they are disengaged from the band, or in other words they move forward. When moving upward, they are not in engagement with the film band, so that the latter remains stationary. The cycle of operation is repeated at each revolution of the spindle 81. By turning the disk 73 in one or the other direction, the uppermost and lowermost positions of the feeding fingers are changed. The purpose of this arrangement is to frame the pictures, or in other words to bring the individual pictures of the film band in proper relation to the exposure opening of the apparatus.

The exposed area of the film band is illuminated by a plurality of sources of light, which are disposed within a housing 85, the longitudinal axis of which is arranged horizontally and in alinement with the center of the exposure opening of the apparatus. This housing is provided at its front with a removable cover 86, and is open at its rear end. This rear end is provided with a circular flange 87, a similar flange 88 being provided upon the front face of the frame section 24. Upon these two flanges is oscillatably mounted a frame 89, having registering apertures 90 in diametrically opposite portions thereof, into which is adapted to be inserted a picture-holder 91 for the reception of pictures, pages of books, etc., for a purpose hereinafter to be described. The cover 86 is provided with a central aperture 92, around which is formed a sleeve 92', in which is slidably disposed a lens-tube 93, containing one or more lenses in operative relation to the exposure opening of the apparatus. The rays of light, which are reflected from the opaque film band and pass through said lens, are diverged by the latter onto a distant surface or screen. The sources of light, in the case illustrated in the drawings, incandescent lamps 94, are disposed in front of the lens in a circle around the lens-tube. Each of the lamps is provided with a metallic reflector 95, that is preferably a paraboloid, as shown in Fig. 1 of the drawings. The reflectors are mounted upon a ring-shaped heat-conducting member 96, into which reach also the sockets 97 of the lamp. In the case illustrated in the drawings the lamps are provided with filaments 98, in the form of helices, the longitudinal axes of which coincide with those of their respective reflectors. Each filament is located in front of the focus of the paraboloid for parallel rays, and for this reason each reflector will reflect and converge the rays emanating from the filament onto an area, which is considerably smaller than that of the mouth of the reflector. The area illuminated by a reflector is that of the exposure opening, and it will be easily seen that, inasmuch as there are a plurality of reflectors within the housing, each of the same directing a converging beam of light onto the same surface, illumination will be obtained of a strength that is equal to those of an individual lamp multiplied by the number of lamps contained in the housing. With the lamp circuit is associated a suitable switch, (not shown in the drawings), for the well known purpose.

The picture-holder 91 is disposed in a plane that intersects at equal angles the beams of light passing from the reflectors to the exposure opening. A picture held in this plane will thus be evenly illuminated by the overlapping converging beams that issue from the reflectors. Experiments have shown that if the stationary picture is shifted from the plane of the picture-holder 91 to the front or the rear, the reflected picture on the screen is not evenly illuminated as to edge and center.

The operation of the apparatus is obvious from the foregoing. The rays of light which are, as above described, thrown upon the entire exposed area of the film, are reflected by the latter, pass through the lens and produce magnified images on the screen or distant surface. Attention is called to the fact that the metallic reflectors absorb the heat components of the rays passing onto them from the light source, and reflect the light rays onto the opaque film band. In other words, the metallic reflectors act as screens, which separate the heat rays from the light rays, and cause practically "cold" light to pass to the film. For this reason the film band, which is usually made of an inflammable material, such as paper, will not be ignited. Of course, heat passes by direct radiation from the light sources to the film band. This heat, however, is taken up by the metallic gate 27, which conducts it to the casing, that is preferably metallic, and thus frees the film from the danger of being ignited.

It is to be observed that while in connection with the reflecting means herein described a particular film feeding device has been specified, any other suitable film advancing construction may be used without departing from the invention.

What I claim is:—

1. In a cinematographic apparatus, the combination with a frame having an exposure opening, of means for feeding an opaque film band past said opening, a lens in front of said opening, a plurality of light emitting bodies disposed around the axis of said lens, and reflecting means for causing a converging cone of light to pass from each of said light emitting bodies onto the exposed area of the film.

2. In a cinematographic apparatus, the combination with a frame having an exposure opening, of means for feeding an opaque film band past said opening, a lens in front of said opening, a plurality of light emitting bodies disposed in a circle around the axis of said lens, and reflecting means for causing a converging cone of light to pass from each of said light emitting bodies onto the exposed area of the film.

3. In a cinematographic apparatus, the combination with a frame having an exposure opening, of means for feeding an opaque film band past said opening, a lens in front of said opening, a plurality of light emitting bodies disposed in a circle around the axis of said lens, the center of said circle coinciding with the axis of said lens, and reflecting means for causing a converging cone of light to pass from each of said light emitting bodies onto the exposed area of the film.

4. In a cinematographic apparatus, the combination with a frame having an exposure opening, of means for feeding an opaque film band past said opening, a lens in front of said opening, a plurality of light emitting bodies disposed around the axis of said lens, and an individual metallic reflector associated with each light emitting body for causing the rays of light emanating from said body to pass in the form of a converging cone onto the exposed area of the film.

5. In a cinematographic apparatus, the combination with a frame having an exposure opening, of means for feeding an opaque film band past said opening, a lens in front of said opening, a plurality of light emitting bodies disposed in a circle around the axis of said lens, and an individual metallic reflector associated with each light emitting body for causing the rays of light emanating from said body to pass in the form of a converging cone onto the exposed area of the film.

6. In a cinematographic apparatus, the combination with a frame having an exposure opening, of means for feeding an opaque film band past said opening, a lens in front of said opening, a plurality of light emitting bodies disposed in a circle around the axis of said lens, the center of said circle coinciding with the axis of said lens, and an individual metallic reflector associated with each light emitting body for causing the rays of light emanating from said body to pass in the form of a converging cone onto the exposed area of the film.

7. In a cinematographic apparatus, the combination with a frame having an exposure opening, of means for feeding an opaque film band past said opening, a lens in front of said opening, a plurality of light emitting bodies disposed around the axis of said lens, and an individual metallic parabolic reflector associated with each light emitting body for causing the rays of light emanating from said body to pass in the form of a converging cone onto the exposed area of the film.

8. In a cinematographic apparatus, the combination with a frame having an exposure opening, of means for feeding an opaque film band past said opening, a lens in front of said opening, a plurality of light emitting bodies disposed in a circle around the axis of said lens, and an individual metallic parabolic reflector associated with each light emitting body for causing the rays of light emanating from said body to pass in the form of a converging cone onto the exposed area of the film.

9. In a cinematographic apparatus, the combination with a frame having an exposure opening, of means for feeding an opaque film band past said opening, a lens in front of said opening, a plurality of light emitting bodies disposed in a circle around the axis of said lens, the center of said circle coinciding with the axis of said lens, and an individual metallic parabolic reflector associated with each light emitting body for causing the rays of light emanating from said body to pass in the form of a converging cone onto the exposed area of the film.

10. In a cinematographic apparatus, the combination with a frame having an exposure opening, of means for feeding an opaque film band past said opening, a picture-holder disposed in a plane in front of that in which the film band lies, a lens in front of said opening, a plurality of light emitting bodies disposed around the axis of said lens, and reflecting means for causing a converging cone of light to pass directly from each of said light emitting bodies onto the exposed area of the film or upon said picture-holder when mounted upon the apparatus.

11. In a cinematographic apparatus, the combination with a frame having an exposure opening, of means for feeding an opaque film band past said opening, a picture-holder disposed in a plane in front of that in which the film band lies, a lens in front of said opening, a plurality of light emitting bodies disposed in a circle around the axis of said lens, and reflecting means for causing a converging cone of light to pass directly from each of said light emitting bodies onto the exposed area of the film or upon said picture-holder when mounted upon the apparatus.

12. In a cinematographic apparatus, the combination with a frame having an exposure opening, of means for feeding an opaque film band past said opening, a picture-holder disposed in a plane in front of that in which the film band lies, a lens in front of said opening, a plurality of light emitting bodies disposed in a circle around the axis of said lens, the center of said circle coinciding with the axis of said lens, and reflecting means for causing a converging cone of light to pass directly from each of said light emitting bodies onto the exposed area of the film or upon said picture-holder when mounted upon the apparatus.

13. In a cinematographic apparatus, the combination with a frame having an exposure opening, of means for feeding an opaque film band past said opening, a picture-holder disposed in a plane in front of that in which the film band lies, a lens in front of said opening, a plurality of light emitting bodies disposed around the axis of said lens, and an individual metallic reflector associated with each light emitting body for causing the rays of light emanating from said body to pass directly in the form of a converging cone onto the exposed area of the film or upon said picture-holder when mounted upon the apparatus.

14. In a cinematographic apparatus, the combination with a frame having an exposure opening, of means for feeding an opaque film band past said opening, a picture-holder disposed in a plane in front of that in which the film band lies, a lens in front of said opening, a plurality of light emitting bodies disposed in a circle around the axis of said lens, and an individual metallic reflector associated with each light emitting body for causing the rays of light emanating from said body to pass directly in the form of a converging cone onto the exposed area of the film or upon said picture-holder when mounted upon the apparatus.

15. In a cinematographic apparatus, the combination with a frame having an exposure opening, of means for feeding an opaque film band past said opening, a picture-holder disposed in a plane in front of that in which the film band lies, a lens in front of said opening, a plurality of light emitting bodies disposed in a circle around the axis of said lens, the center of said circle coinciding with the axis of said lens, and an individual metallic reflector associated with each light emitting body for causing the rays of light emanating from said body to pass directly in the form of a converging cone onto the exposed area of the film or upon said picture-holder when mounted upon the apparatus.

Signed at New York, in the county of New York, and State of New York, this 10th day of Feb., A. D. 1916.

HARTWELL W. WEBB.